US008254943B1

United States Patent
Dinan et al.

(10) Patent No.: US 8,254,943 B1
(45) Date of Patent: Aug. 28, 2012

(54) METHOD FOR BACKHAUL TRANSPORT RECOVERY

(75) Inventors: Esmail Hejazi Dinan, Herndon, VA (US); Mohammad Hassan Partovi, Potomac, MD (US); Mehdi Alasti, Rockville, MD (US); Behnam Neekzad, Silver Spring, MD (US)

(73) Assignee: Sprint Communications Company L.P., Overland Park, KS (US)

( * ) Notice: Subject to any disclaimer, the term of this patent is extended or adjusted under 35 U.S.C. 154(b) by 733 days.

(21) Appl. No.: 12/340,992

(22) Filed: Dec. 22, 2008

(51) Int. Cl.
*H04W 72/00* (2009.01)

(52) U.S. Cl. ........ 455/450; 455/454; 455/449; 455/423; 455/67.7; 455/69; 370/253; 370/252; 370/315; 370/424; 370/423

(58) Field of Classification Search .................. 455/450, 455/454, 449, 423, 67.7, 67.11, 67.14, 69, 455/126, 91; 370/253, 252, 424, 423, 328, 370/315, 248, 249
See application file for complete search history.

(56) References Cited

U.S. PATENT DOCUMENTS

| | | | | |
|---|---|---|---|---|
| 5,570,367 | A * | 10/1996 | Ayanoglu et al. | 370/346 |
| 7,567,781 | B2 * | 7/2009 | Chen et al. | 455/69 |
| 7,839,771 | B2 * | 11/2010 | Zeng et al. | 370/225 |
| 8,068,440 | B2 * | 11/2011 | Stanwood et al. | 370/252 |
| 2003/0021251 | A1 | 1/2003 | Moshiri-Tafreshi et al. | |
| 2004/0062214 | A1 * | 4/2004 | Schnack et al. | 370/315 |
| 2006/0215582 | A1 | 9/2006 | Castagnoli et al. | |
| 2007/0030809 | A1 * | 2/2007 | Dayama | 370/237 |
| 2007/0218868 | A1 * | 9/2007 | Schefczik et al. | 455/404.1 |
| 2010/0113027 | A1 * | 5/2010 | Hsu | 455/436 |
| 2011/0317544 | A1 * | 12/2011 | Chou | 370/216 |

OTHER PUBLICATIONS

Yan He and Dmirei Perkins (BASH: A Backhaul-Aided Seamless Handoff Scheme for Wireless Mesh Networks), 2008 IEEE, pp. 1-8.*

* cited by examiner

*Primary Examiner* — Ajit Patel
*Assistant Examiner* — Khai M Nguyen

(57) ABSTRACT

In various embodiments, methods and systems are provided for backhaul transport recovery. In an embodiment, a method for backhaul transport recovery is provided. The method includes broadcasting a backhaul recovery request, and receiving backhaul recovery responses from at least one wireless device. The method also includes selecting at least one wireless recovery device from the at least one wireless device based upon the backhaul recovery responses, and establishing at least one backhaul recovery channel through the at least one wireless recovery device.

14 Claims, 7 Drawing Sheets

METHOD FOR BACKHAUL TRANSPORT RECOVERY

TECHNICAL BACKGROUND

Wireless communications systems commonly include a base station serving a number of wireless devices. The base station is connected through a backhaul link and a gateway to a network or the Internet. Backhaul links may be constructed with any of a variety of technologies, such as T1 and digital signal 3 (DS3), microwave, fiber, and hybrid technologies. These backhaul links may be expensive to build and operate, so many base stations are equipped with a single backhaul link to a gateway, and no backup link in case of backhaul link failure. Some critical base stations may be provided with a second backhaul link, however, this is not the case for most typical base stations.

When a backhaul link fails, the base station, and thus any wireless devices using the base station, are unable to communicate with the network. Some devices may be capable of communicating with more than one base station based on their location and the ranges of the various base stations. These devices may switch over from the base station with a failed backhaul link to a base station with an operative backhaul link, however other devices using the base station with the failed backhaul link do not have such an option.

OVERVIEW

In various embodiments, methods and systems are provided for backhaul transport recovery. In an embodiment, a method for backhaul transport recovery is provided. The method includes broadcasting a backhaul recovery request, and receiving backhaul recovery responses from at least one wireless device. The method also includes selecting at least one wireless recovery device from the at least one wireless device based upon the backhaul recovery responses, and establishing at least one backhaul recovery channel through the at least one wireless recovery device.

In another embodiment, a method for backhaul transport recovery is provided. The method includes detecting a backhaul failure, and broadcasting a backhaul recovery request to a plurality of wireless devices. The method further includes receiving backhaul recovery responses from at least one of the plurality of wireless devices. Each of the backhaul recovery responses includes a target base station identification, a device mobility, a carrier to interference-plus-noise ratio for a serving base station, a carrier to interference-plus-noise ratio for the target base station, a target base station downlink capacity, and a target base station uplink capacity.

The method also includes ranking the backhaul recovery responses producing a ranked list of potential recovery devices, and selecting at least one recovery device from the ranked list, wherein the total target base station uplink capacity of the at least one recovery device is greater than a total subscribers uplink traffic, and wherein the total target base station downlink capacity of the at least one recovery device is greater than a total subscribers downlink traffic. The method further includes establishing at least one backhaul recovery channel through the at least one recovery device, and transmitting backhaul traffic through the at least one backhaul recovery channel.

In a further embodiment, a method for backhaul transport recovery is provided. The method includes receiving a backhaul recovery request at a wireless device transmitted from a serving base station experiencing backhaul failure, and scanning neighboring base stations to identify one or more potential target base stations. The method also includes transmitting a base station backhaul recovery request to at least one of the one or more potential target base stations, and receiving a base station backhaul recovery response from the at least one of the one or more potential target base stations.

The method further includes creating a backhaul recovery response from the base station backhaul recovery response, and transmitting the backhaul recovery response to the serving base station. The method also includes receiving a backhaul recovery channel request from the serving base station, establishing backhaul recovery channels with a target base station specified in the backhaul recovery channel request and the serving base station, and forwarding backhaul traffic from the serving base station to the target base station.

DETAILED DESCRIPTION

Backhaul links are used to convey traffic from wireless base stations to networks including the Internet, often through a gateway. Backhaul links may use any of a wide variety of backhaul technologies, such as T1 and digital signal 3 (DS3), microwave, fiber, and hybrid technologies. These backhaul links may be expensive to create and operate. Because of this expense, many wireless base stations are equipped with a single backhaul link, and only critical base stations are equipped with a backup link. When a backhaul link fails the base station is left without any way to transfer traffic to and from the network. Most current solutions to this problem require the purchase and installation of alternate backhaul links which are potentially expensive to create and operate.

Figure 1:
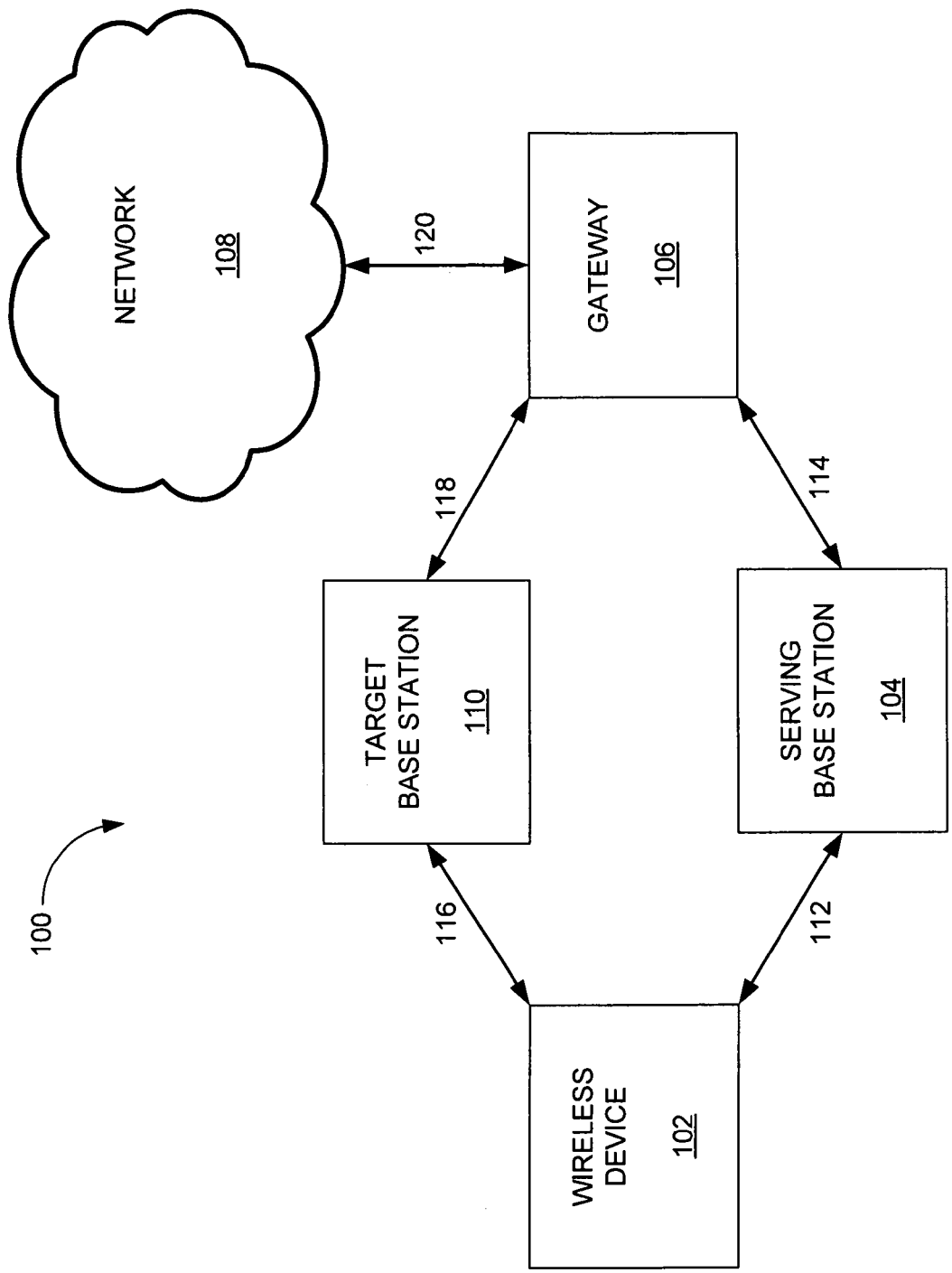
FIG. 1 is a block diagram illustrating a communication system configured for backhaul transport recovery.

Referring to FIG. 1, a block diagram is provided illustrating an exemplary embodiment of a communication system 100 configured for backhaul transport recovery. In this example, communication system 100 includes wireless device 102, target base station 110, serving base station 104, gateway 106, and network 108. Wireless device 102 is coupled with target base station 110 through link 116, and with serving base station 104 through link 112. Gateway 106 is coupled with target base station 110 through link 118, and with serving base station 104 through link 114. Gateway 106 is also coupled with network 108 through link 120.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Wireless device 102 may be any device, system combination of devices, or other such communication platform capable of communicating wirelessly with serving base station 104 and target base station 110. Wireless device 102 may be, for example, a mobile phone, a wireless phone, a wireless modem, a personal digital assistant (PDA), a Voice over Internet Protocol (VoIP) phone, a voice over packet (VOP) phone, or a soft phone, as well as other types of devices or systems that can exchange audio or data with network 108 via serving base station 104 or target base station 110 through gateway 106. Other types of communication platforms are possible.

In this example, link 114 is a backhaul link between serving base station 104 and gateway 106, while link 118 is a backhaul link between target base station 110 and gateway 106. Backhaul traffic is passed by gateway 106 to network 108 over link 120. Backhaul links may use any of a wide variety of backhaul technologies, such as T1 and digital signal 3 (DS3), microwave, fiber, and hybrid technologies. Since these links may be expensive, often there is only one link between a gateway and a base station. If a backhaul link fails between a gateway and base station, there typically is no backup link present.

In many cases, when a backhaul link fails, the base station automatically shuts down the transmit power on the backhaul link. This reduces interference in the network of links, but does not repair the backhaul failure. Typically only critical sites have an additional backhaul recovery link, since this is an expensive remedy to backhaul failures.

In the embodiment illustrated in FIG. 1, when backhaul link 114 fails, a backhaul recovery path is created through wireless device 102, target base station 110, and backhaul link 118. When serving base station 104 detects a failure in backhaul link 114, it broadcasts a backhaul recovery message to some or all of the wireless devices in its range. This backhaul recovery message may contain any of a wide variety of parameters and other information for use by the wireless devices and target base stations.

Wireless devices capable of acting as a backhaul recovery device scan for neighboring base stations in response to the backhaul recovery message. Wireless devices within the range of both serving base station 104 and any other base station capable of acting within a backhaul recovery channel then return a backhaul recovery response to serving base station 104. This backhaul recovery response contains a variety of information about the potential target base station. For example, a backhaul recovery response may include an identification of the target base station, available target base station upload capacity, available target base station download capacity and air interface quality indicator between the wireless device and the two base stations. The response may also include a parameter describing the mobility of the wireless device.

The available upload and download capacities may be limited by the bandwidth of the wireless device and the target base station. The air interface quality indicator is a measurement of the quality of the connection from the wireless device to the serving base station and the target base station. In some embodiments, the air interface quality indicator may be a carrier to interference-plus-noise ratio (CINR).

Continuing with FIG. 1, serving base station 104 may receive one or more backhaul recovery responses from one or more wireless devices. It then chooses one or more wireless device for use as a recovery device. This selection is accomplished based upon the parameters within the backhaul recovery responses from the wireless devices. Any of a wide variety of methods may be used within the selection process. In an example, serving base station 104 creates a ranked list of potential wireless recovery devices. The ranked list contains all of the wireless devices that returned backhaul recovery responses. In some embodiments, serving base station 104 may only send backhaul recovery messages to wireless devices capable of communicating with more than one base station. In other embodiments, only wireless devices capable of communicating with more than one base station will respond to backhaul recovery messages.

In one embodiment, the ranked list is created by ranking potential wireless recovery devices according to a number of parameters from their backhaul recovery responses. For example, the potential backhaul wireless recovery devices may be ranked first according to their mobility, giving the devices with the lowest mobility the highest ranking. This ranking allows serving base station 104 to avoid selecting highly mobile wireless recovery devices, since these mobile devices may quickly move out of range of serving base station 104 or target base station 110 destroying any backhaul recovery channel through the mobile device.

The list of potential wireless recovery devices may then be ranked according to the air interface quality indicators of the wireless recovery devices. In one example, the air interface quality indicator for the potential wireless device and serving base station 104 may be summed with the air interface quality indicator for the potential wireless recovery device and the potential target base station. The potential wireless recovery devices may then be ranked according to this sum, placing devices with highest air interface quality indicators above devices with lower air interface quality indicators. This ranking allows serving base station 104 to select wireless recovery devices having the best available signal quality for the backhaul recovery channel.

Finally, the potential wireless recovery devices are ranked according to their available upload and download capacity to the target base station. In some examples, the available target base station upload capacity is added to the available target base station download capacity, and the potential wireless recovery devices are ranked according to this sum. This ranking allows serving base station 104 to select devices with the largest capacities first, resulting in the selection of the fewest number of wireless recovery devices necessary to carry the backhaul traffic from serving base station 104. In one example, serving base station 104 selects wireless recovery devices by starting at the top of the ranked list, and continuing to select devices until the available uplink recovery link capacity is greater than the total subscribers uplink traffic from other users, and until the available downlink recovery link capacity is greater than the total subscribers downlink traffic from other users.

Once wireless recovery devices and target base stations have been selected, backhaul recovery channels are established through these devices and base stations. In some cases, only one wireless recovery device and target base station is required to handle all of the recovery backhaul traffic. In other cases, multiple wireless recovery devices and target base stations may be selected in order to handle all of the recovery backhaul traffic. Once the backhaul recovery channels have been established, serving base station 104 transmits backhaul data to gateway 106 through link 112, wireless device 102, link 116, target base station 110, and link 118.

In an embodiment, wireless device 102 continues to receive and transmit normal access traffic while it is acting as a backhaul recovery device. This allows the backhaul recovery process to proceed without disrupting communications to and from the wireless devices serviced by serving base station 104.

Figure 2:
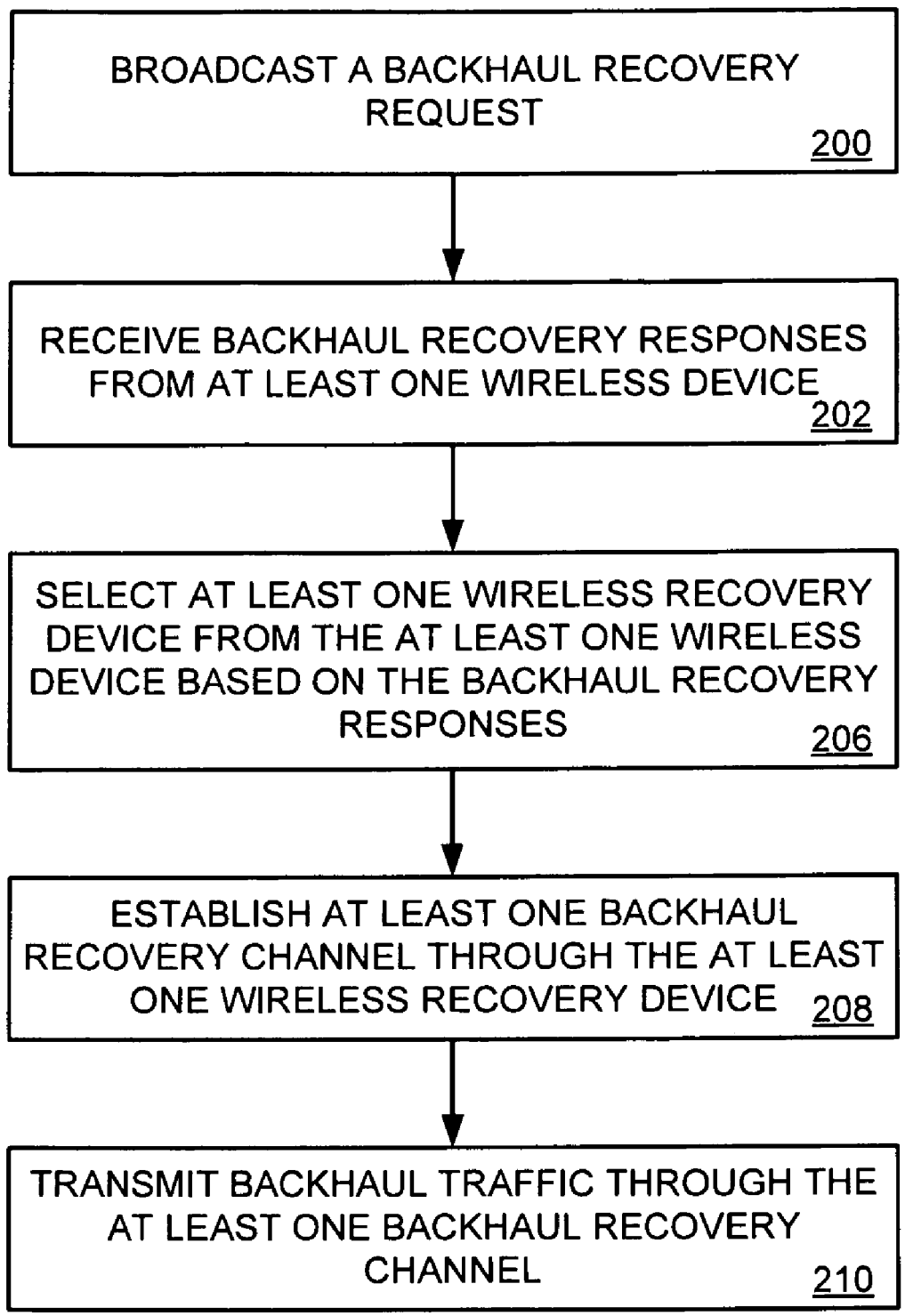
FIG. 2 is a flow diagram illustrating a method for backhaul transport recovery.

FIG. 2 is a flow diagram illustrating a method for backhaul transport recovery in a communication system similar to that illustrated in FIG. 1. In this example, when serving base station 104 detects a backhaul failure it broadcasts a backhaul recovery message to some or all of the wireless devices within its range (operation 200). In response to this backhaul recovery message, serving base station 104 receives backhaul recovery responses from at least one wireless device, such as wireless device 102 (operation 202).

Serving base station 104 ranks the backhaul recovery responses, producing a ranked list of potential wireless recovery devices (operation 204). This ranking may use any or all of the methods described above with respect to FIG. 1, or any other ranking method. Serving base station 104 then selects at least one recovery device from the ranked list of potential recovery devices (operation 206). Selection may continue until the upload capacity and download capacity of the recovery devices surpasses the amount of capacity required by the failed backhaul link. In some examples, there may not be sufficient recovery devices available to satisfy all of the backhaul capacity needs. In such an example, all of the recovery devices from the ranked list may be used in an attempt to transfer as much backhaul traffic as possible.

Once recovery devices have been selected, serving base station 104 establishes at least one backhaul recovery channel through the at least one recovery devices (operation 208). Serving base station 104 then transmits backhaul traffic through the at least one backhaul recovery channel (operation 210).

Figure 3:
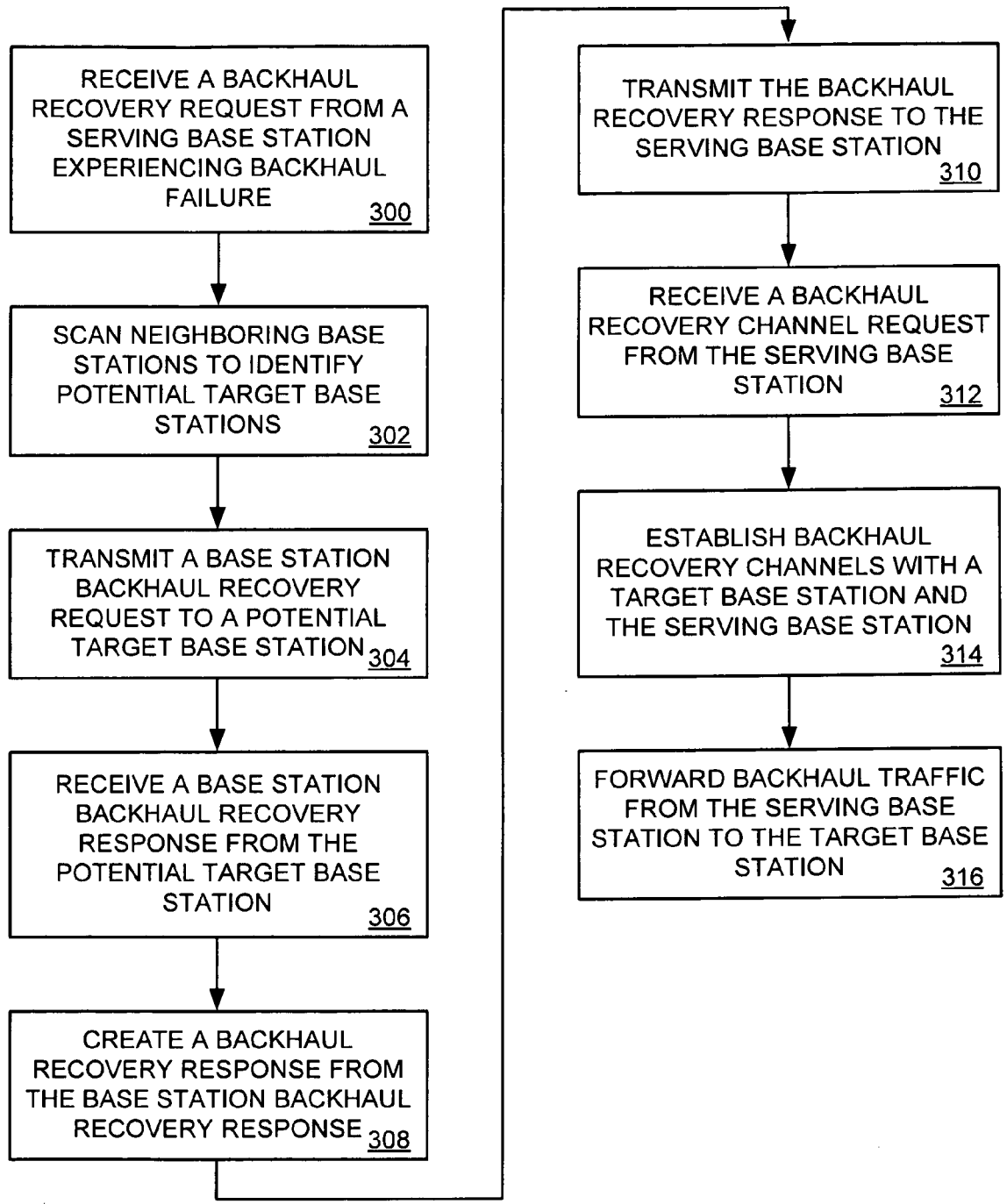
FIG. 3 is a flow diagram illustrating a method for backhaul transport recovery.

FIG. 3 is a flow diagram illustrating a method for backhaul transport recovery in a wireless device similar to that illustrated in FIG. 1. In this example, wireless device 102 receives a backhaul recovery request from serving base station 104 which is experiencing backhaul failure (operation 300). Wireless device 102 scans neighboring base stations to identify potential target base stations (operation 302).

Wireless device 102 then transmits a base station backhaul recovery request to a potential target base station (operation 304). In response to the base station backhaul recovery request, wireless device 102 receives a base station backhaul recovery response from the potential target base station (operation 306).

Wireless device 102 creates a backhaul recovery response from the base station recovery response (operation 308). This backhaul recovery response may contain a variety of parameters such as those discussed above with respect to FIG. 1. Wireless device 102 transmits the backhaul recovery response to serving base station 104 (operation 310).

If wireless device 102 is selected as a wireless recovery device, it receives a backhaul recovery channel request from serving base station 104 (operation 312). In response to the backhaul recovery channel request, wireless device 102 establishes backhaul recovery channels with target base station 110 and serving base station 104 (operation 314). Wireless device 102 then forwards backhaul traffic from serving base station 104 to target base station 110 where it is then transmitted to gateway 106 (operation 316).

Figure 4A:
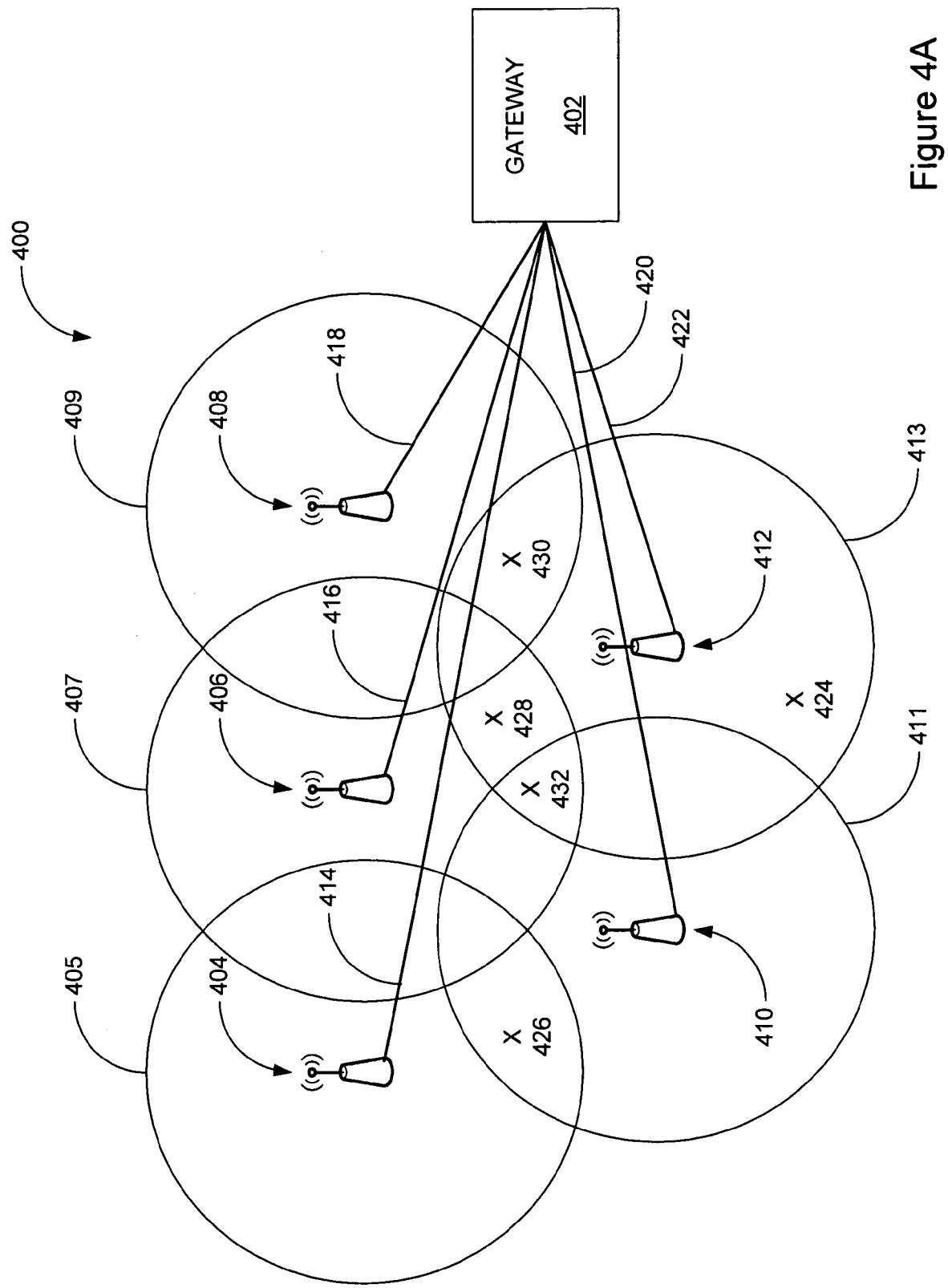
FIGS. 4A, 4B, and 4C are block diagrams illustrating a communication system configured for backhaul transport recovery.
Figure 4B:
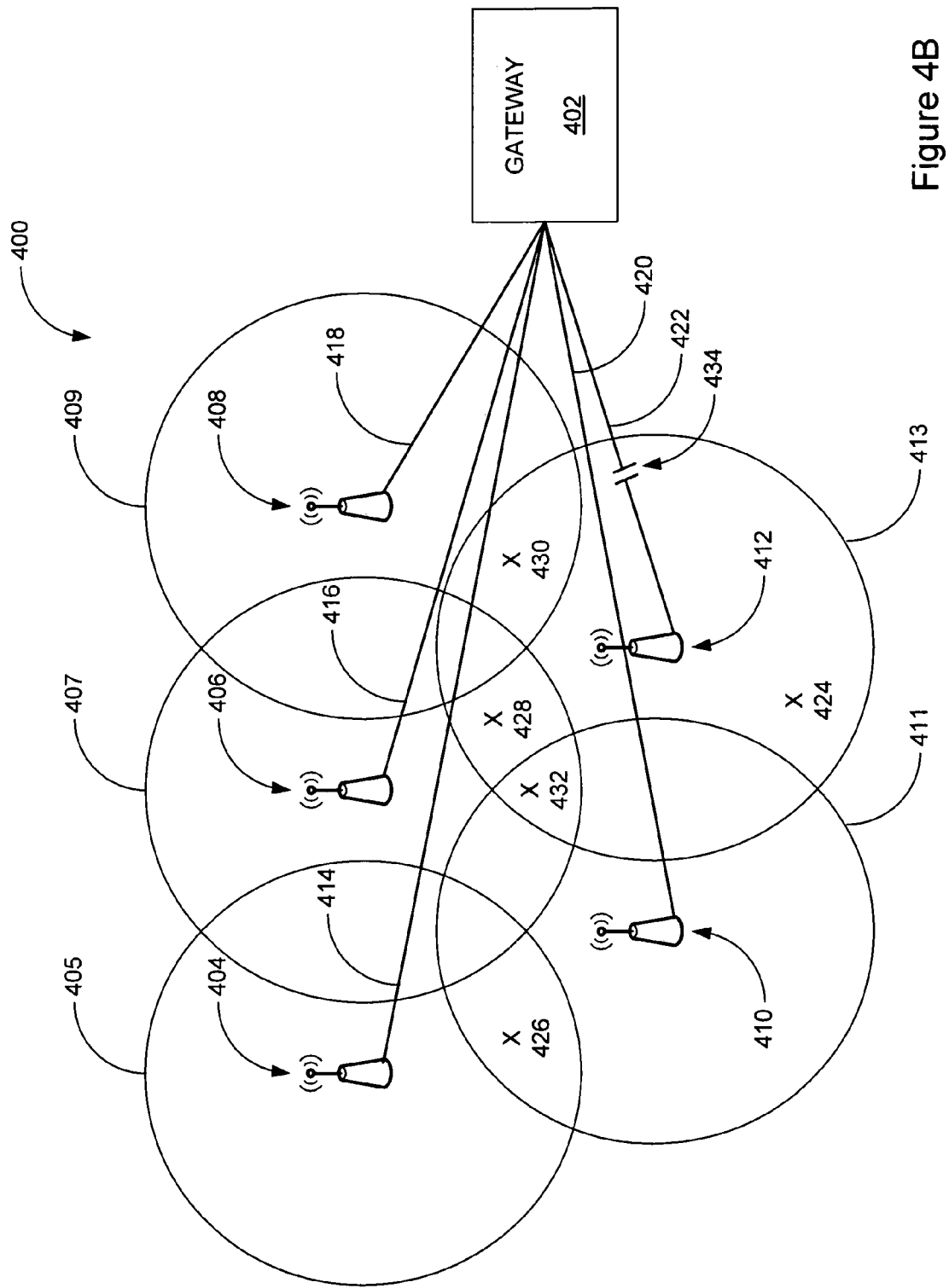
Figure 4C:
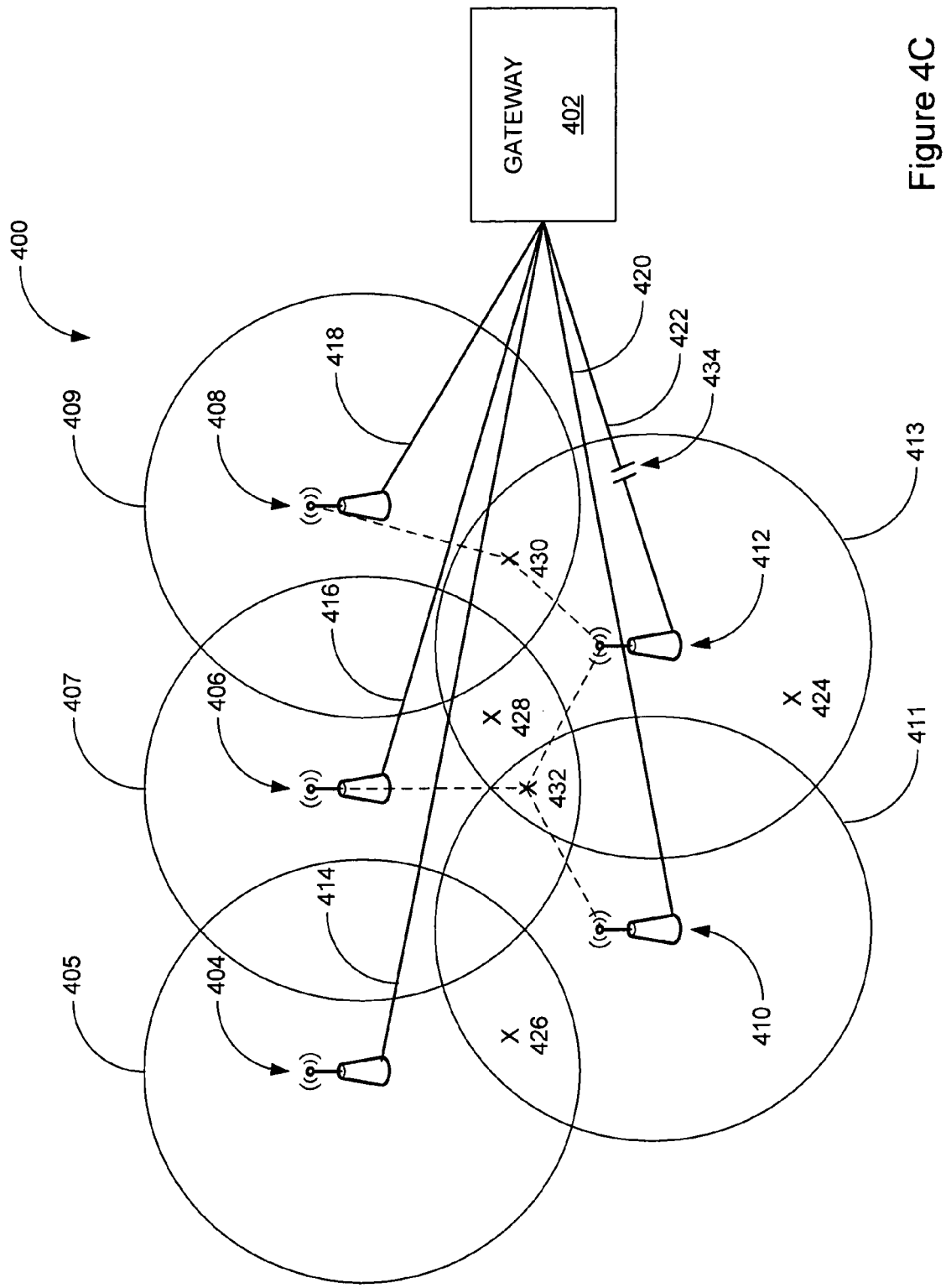

FIGS. 4A, 4B, and 4C are block diagrams illustrating a communication system 400 configured for backhaul transport recovery. These three figures illustrate a communication system 400 including five base stations, five wireless devices, and a gateway. Base station 404 is illustrated with a range or coverage area designated by a circle labeled 405. Base station 406 is illustrated with a range or coverage area designated by a circle labeled 407. Base station 408 is illustrated with a range or coverage area designated by a circle labeled 409. Base station 410 is illustrated with a range or coverage area designated by a circle labeled 411. Base station 412 is illustrated with a range or coverage area designated by a circle labeled 413. While this example shows circular ranges or coverage areas for simplicity, many ranges are not exactly circular in shape. Coverage areas may be affected by buildings, mountains, tunnels, overpasses, and other objects resulting in irregularly shaped ranges.

Note that the range 405 of base station 404 overlaps the ranges of base stations 406 and 410. The range 407 of base station 406 overlaps the ranges of base stations 404, 408, 410, and 412. The range 409 of base station 408 overlaps the ranges of base stations 406 and 412. The range 411 of base station 410 overlaps the ranges of base stations 404, 406, and 412. The range 413 of base station 412 overlaps the ranges of base stations 406, 408, and 410. These overlapping ranges represent locations where wireless devices are potentially capable of communicating with more than one base station.

Base station 404 is coupled with gateway 402 through backhaul link 414. Base station 406 is coupled with gateway 402 through backhaul link 416. Base station 408 is coupled with gateway 402 through backhaul link 418. Base station 410 is coupled with gateway 402 through backhaul link 420. Base station 412 is coupled with gateway 402 through backhaul link 422.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Wireless device 424 is within range 413 of base station 412. Wireless device 426 is within range 405 of base station 404 and range 411 of base station 410. Wireless device 428 is within range 407 of base station 406 and range 413 of base station 412. Wireless device 430 is within range 409 of base station 408 and range 413 of base station 412. Wireless device 432 is within range 407 of base station 406, range 411 of base station 410, and range 413 of base station 412.

Given these devices and ranges, wireless device 424 is capable of communicating with base station 412, wireless device 426 is capable of communicating with base stations 404 and 410, wireless device 428 is capable of communicating with base stations 406 and 412, wireless device 430 is capable of communicating with base stations 408 and 412, and wireless device 432 is capable of communicating with base stations 406, 410, and 412.

Wireless devices 424, 426, 428, 430, and 432 may be any device, system combination of devices, or other such communication platform capable of communicating wirelessly with base stations 404, 406, 408, 410, and 412. Wireless devices 424, 426, 428, 430, and 432 may be, for example, a mobile phone, a wireless phone, a wireless modem, a personal digital assistant (PDA), a Voice over Internet Protocol (VoIP) phone, a voice over packet (VOP) phone, or a soft phone, as well as other types of devices or systems that can exchange audio or data with a network via base stations 404, 406, 408, 410, and 412 through gateway 402. Other types of communication platforms are possible.

FIG. 4A illustrates communication system 400 in the case where all of the backhaul links are up and working correctly. FIG. 4B illustrates communication system 400 in the case where backhaul link 422 has failed. FIG. 4C illustrates communication system 400 in the case where backhaul link 422 has failed, and recovery backhaul channels have been established.

Referring now to FIG. 4B, backhaul link 422 has failed at break 434. In this case backhaul traffic from base station 412 is unable to be sent to gateway 402. In this case, base station 412 begins the backhaul recovery method illustrated in FIGS. 1 and 2, setting up several backhaul recovery channels illustrated in FIG. 4C.

Referring now to FIG. 4C, base station 412 has set up three backhaul recovery channels (represented by dashed lines). A first backhaul recovery channel has been established through wireless device 430, base station 408, and backhaul link 418 to gateway 402. A second backhaul recovery channel has been established through wireless device 432, base station 406 and backhaul link 416 to gateway 402. A third backhaul recovery channel has been established through wireless device 432, base station 410, and backhaul link 420 to gateway 402.

Note that wireless devices 424, 426, and 428 have not been used as wireless recovery devices. This may be due to a variety of reasons. For example, notice that wireless device 424 is not capable of communicating with more than one base station since it is only within the range of base station 412. This eliminates wireless device 424 from consideration as a wireless recovery device.

Wireless device 426 is capable of communicating with two base stations, however it is not within the range of base station 412 and would not have received a backhaul recovery message from base station 412. Finally, base station 428 is capable of communicating with three base stations, and is within the range of base station 412, however, it may very mobile, have poor air interface quality, low upload or download capacity, and thus may not have been selected by base station 412 as a wireless recovery device.

The methods, systems, devices, processors, equipment, and servers described above may be implemented with, contain, or be executed by one or more computer systems. The methods described above may also be stored on a computer readable medium for execution by a computer system. Many of the elements of communication systems 100 and 400 may be, comprise, or include computer systems. This includes, but is not limited to: wireless device 102, serving base station 104, gateway 106, target base station 110, base stations 404, 406, 408, 410, and 412, wireless devices 424, 426, 428, 430, and 432, and gateway 402. These computer systems are illustrated, by way of example, in FIG. 5.

Figure 5:
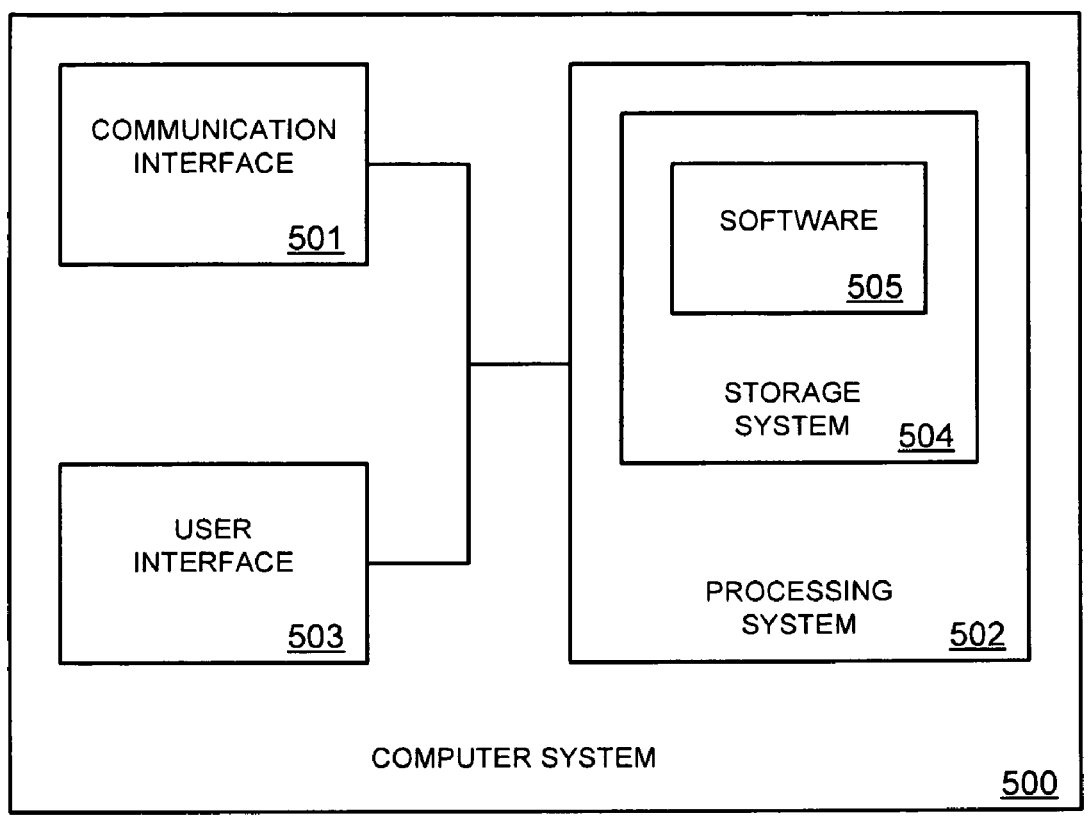
FIG. 5 is a block diagram illustrating a computing system configured for backhaul transport recovery.

FIG. 5 is a block diagram illustrating a computing system that may be utilized by the network elements described in FIGS. 1, 2, 3 and 4 and for the methods described herein. Computing node 500 includes communication interface 501, processing system 502, and user interface 503. Processing system 502 includes storage system 504. Storage system 504 stores software 505. Processing system 502 is linked to communication interface 501 and user interface 503. Computing node 500 could be comprised of a programmed general-purpose computer, although those skilled in the art will appreciate that programmable or special purpose circuitry and equipment may be used. Computing node 500 may be distributed among multiples devices that together comprise elements 500-505.

Communication interface 501 could comprise a network interface, modem, port, transceiver, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. User interface 503 may be distributed among multiple user devices. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, utilities, drivers, networking software, and other software typically loaded onto a computer system. Software 505 could comprise an application program, firmware, or some other form of machine-readable processing instructions. When executed by processing system 502, software 505 directs processing system 502 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for backhaul transport recovery comprising:
   broadcasting a backhaul recovery request;
   receiving backhaul recovery responses from a plurality of mobile wireless devices wherein at least some of the backhaul recovery responses include a target base station identification, a device mobility, an air interface quality indicator for a serving base station, an air interface quality indicator for the target base station, a target base station downlink capacity, and a target base station uplink capacity;
   selecting at least one wireless recovery device from the mobile wireless devices based at least in part upon the device mobility in the backhaul recovery responses; and
   establishing at least one backhaul recovery channel through the at least one wireless recovery device.

2. The method of claim 1 wherein the air interface quality indicator is a carrier to interference-plus-noise ratio.

3. The method of claim 1 wherein the at least one wireless recovery device within the at least one recovery path continues to transmit and receive access traffic in addition to acting as a backhaul recovery device.

4. The method of claim 1 wherein the at least one wireless recovery device is a subscriber station.

5. The method of claim 1 wherein the backhaul recovery request is broadcast only to wireless devices capable of communicating with more than one base station.

6. The method of claim 1 wherein only wireless devices capable of communicating with more than one base station respond to the backhaul recovery request.

7. The method of claim 1 further comprising:
   transmitting backhaul traffic through the at least one backhaul recovery channel.

8. A method for backhaul transport recovery comprising:
   broadcasting a backhaul recovery request;
   receiving backhaul recovery responses from at least one wireless device;
   selecting at least one wireless recovery device from the at least one wireless device based upon the backhaul recovery responses;

establishing at least one backhaul recovery channel through the at least one wireless recovery device, wherein each of the backhaul recovery responses include a target base station identification, a device mobility, an air interface quality indicator for a serving base station, an air interface quality indicator for the target base station, a target base station downlink capacity, and a target base station uplink capacity;

wherein the air interface quality indicator is a carrier to interference-plus-noise ratio; and wherein selecting the at least one wireless recovery device further comprises ranking the backhaul recovery responses resulting in a ranked list of wireless devices, wherein ranking the backhaul recovery responses comprises ranking wireless devices based on their device mobility, wherein wireless devices with the lowest mobility are ranked highest.

9. The method of claim 8 wherein ranking the backhaul recovery responses comprises ranking wireless devices based on the sum of their carrier to interference-plus-noise ratio for the serving station and carrier to interference-plus-noise ratio for the target station, wherein wireless devices with the largest ratios are ranked highest.

10. The method of claim 9 wherein ranking the backhaul recovery responses comprises ranking wireless devices based on the sum of their target base station downlink capacity and uplink capacity, wherein wireless devices with the highest capacities are ranked highest.

11. The method of claim 8 wherein selecting at least one wireless recovery device comprises selecting at least one wireless recovery device starting at the top of the ranked list of wireless devices, and proceeding down the ranked list of wireless devices until the sum of the target base station uplink capacities of the selected wireless recovery devices exceeds a total subscribers uplink traffic from other users.

12. The method of claim 8 wherein selecting at least one wireless recovery device comprises selecting at least one wireless recovery device starting at the top of the ranked list of wireless devices, and proceeding down the list until the sum of the target base station downlink capacities of the selected wireless recovery devices exceeds a total subscribers downlink traffic from other users.

13. A method for backhaul transport recovery comprising:
detecting a backhaul failure;
broadcasting a backhaul recovery request to a plurality of wireless devices;
receiving backhaul recovery responses from at least one of the plurality of wireless devices, wherein each of the backhaul recovery responses comprise:
a target base station identification;
a device mobility;
a carrier to interference-plus-noise ratio for a serving base station;
a carrier to interference-plus-noise ratio for the target base station;
a target base station downlink capacity; and
a target base station uplink capacity;
ranking the backhaul recovery responses producing a ranked list of potential recovery devices;
selecting at least one recovery device from the ranked list, wherein the total target base station uplink capacity of the at least one recovery device is greater than a total subscribers uplink traffic, and wherein the total target base station downlink capacity of the at least one recovery device is greater than a total subscribers downlink traffic;
establishing at least one backhaul recovery channel through the at least one recovery device; and
transmitting backhaul traffic through the at least one backhaul recovery channel.

14. The method of claim 13 wherein the backhaul recovery responses are first ranked according to their device mobility in reverse order wherein devices with the lowest mobility are ranked highest, then according to the sum of their carrier to interference-plus-noise ratios wherein devices with the largest ratios are ranked highest, and finally according to the sum of their target base station downlink and uplink capacities wherein devices with the largest capacities are ranked highest.

* * * * *